United States Patent [19]

Kato

[11] Patent Number: 4,759,117

[45] Date of Patent: * Jul. 26, 1988

[54] METHOD OF MANUFACTURE OF A MAGNETIC ROTOR CORE MEMBER FOR A DYNAMOELECTRIC MACHINE

[75] Inventor: Masa Kato, Ibaragi, Japan

[73] Assignee: Kato Iron Works, Ltd., Japan

[*] Notice: The portion of the term of this patent subsequent to Dec. 17, 2002 has been disclaimed.

[21] Appl. No.: 862,462

[22] Filed: May 12, 1986

[30] Foreign Application Priority Data

Oct. 25, 1985 [JP] Japan ................. 60-240222

[51] Int. Cl.[4] ............................................. H02K 15/02
[52] U.S. Cl. ................................... 29/598; 72/377
[58] Field of Search ............. 29/598; 72/352, 356, 72/358, 377, 344; 310/257, 263

[56] References Cited

U.S. PATENT DOCUMENTS

| | | | |
|---|---|---|---|
| 3,271,604 | 11/1962 | Priddy | 29/598 X |
| 4,041,754 | 8/1977 | Otani | 72/356 |
| 4,558,511 | 12/1985 | Kato | 29/598 |

OTHER PUBLICATIONS

Melvin H. Verson, "The Ford Sandusky Project", Nov. 2,3 and 4, 1965, pp. 8–10.

Primary Examiner—Carl E. Hall
Attorney, Agent, or Firm—Kinzer, Plyer, Dorn, McEachran & Jambor

[57] ABSTRACT

A method of manufacturing a magnetic rotor core member for a rotating-field dynamomoelectric machine, particularly a small alternator, including the steps of: hot forging a segment of steel bar stock into a core blank approximating the external configuration desired for the rotor core member but with the pole piece fingers shorter than required for the finished pole pieces; de-burring the core blank; coining the core blank into closer conformation to the desired core member configuration; gradually cooling the core blank; rough machining only two opposed surfaces of the hub and base to assure a controlled uniform volume for subsequent processing; cold punching a shaft aperture through the hub of the core blank and simultaneously ironing the pole piece fingers into close conformity with the required finished dimensions, in particular lengthening the fingers; and, finally, cold-compressing the core blank to finished form as a rotor core member in a single cold compression step.

7 Claims, 2 Drawing Sheets

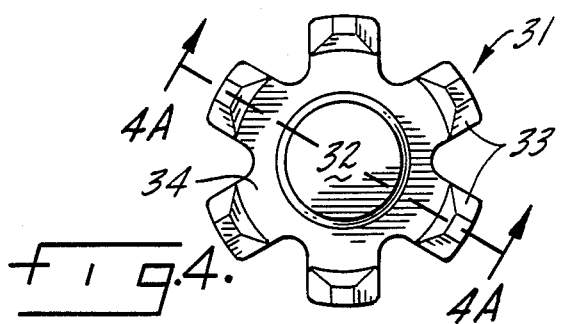
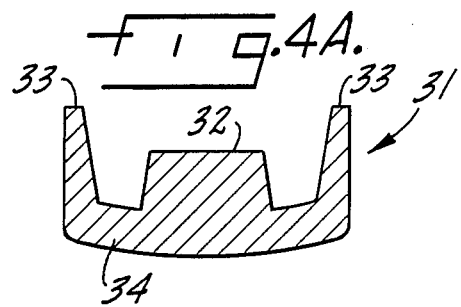
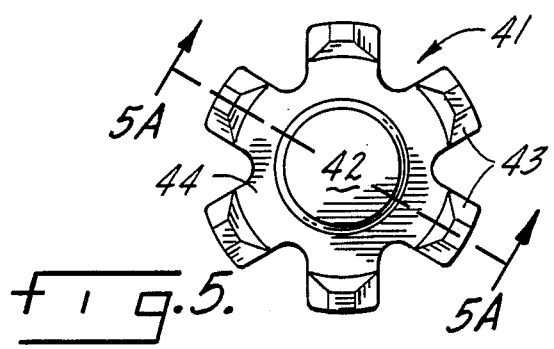
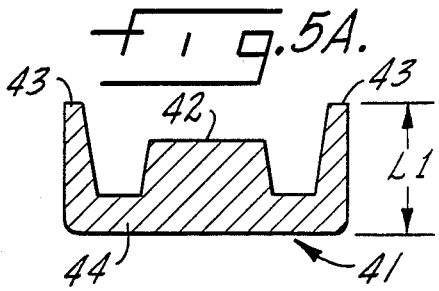
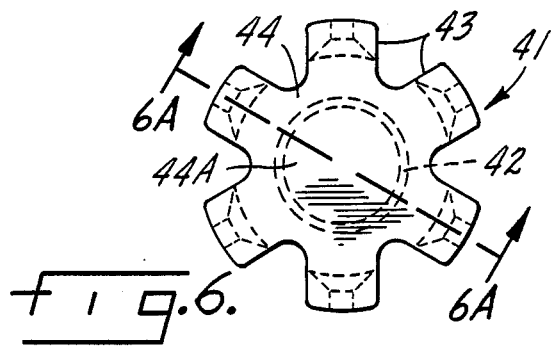
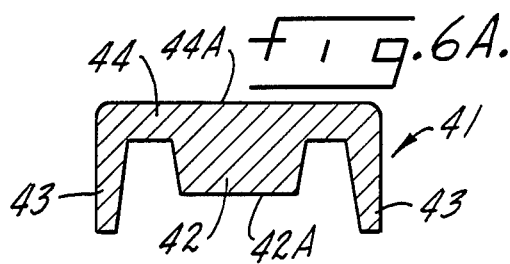
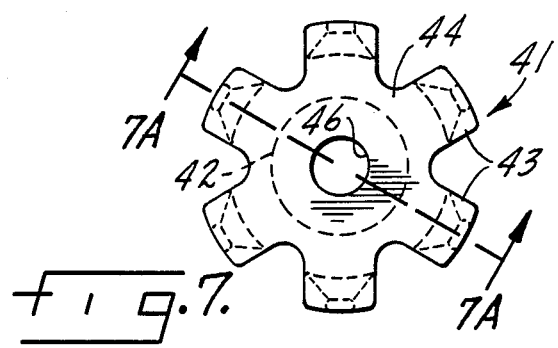
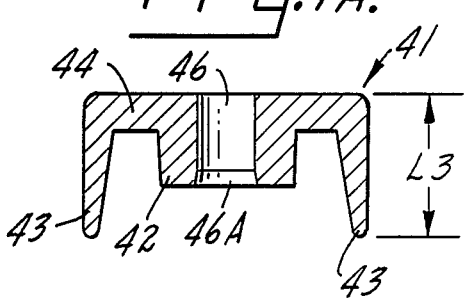
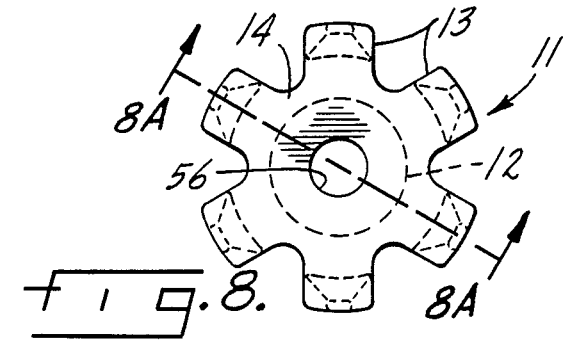
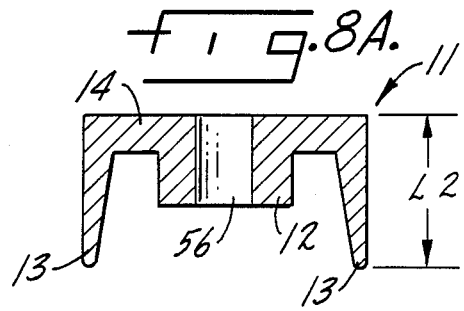

METHOD OF MANUFACTURE OF A MAGNETIC ROTOR CORE MEMBER FOR A DYNAMOELECTRIC MACHINE

BACKGROUND OF THE INVENTION

Automotive vehicles and small vessels use D.C. electrical power sources for operation of lights and controls; the traditional power source for these applications once was a D.C. generator driven from the vehicle engine. More recently, with major improvements in rectifier technology, the D.C. generator has been replaced by the combination of a small alternator and a rectifier. The most practical and most widely used type of alternator employs a rotating field, using a field coil mounted in a core formed by two magnetic steel core members with interleaved finger-like pole pieces. For these magnetic core members, precision manufacture is essential.

Traditional processes that have been employed in the manufacture of magnetic rotor core members for alternators and like dynamoelectric machines include the cold forging (or cold extrusion) process, the cold forming stamping process, and the hot forging process. These manufacturing procedures have each incorporated methods and techniques that have been developed independently and separately for each. Though significant improvements and advances in all of these methods have been achieve during past years, each of the traditional processes nevertheless still presents drawbacks and disadvantages which have proved difficult or impossible to overcome. Accordingly, each of the traditional procedures still leaves much to be desired in terms of yield rate, productivity, equipment required, etc.

For instance, the cold forging or cold extrusion method requires a large scale, high capacity press that affords an extremely high processing force. This presents substantial problems with respect to operating life and productivity of the tooling employed in the press. The cold forming stamping process presents a distinct disadvantage with respect to excessive consumption of the material from which a preliminary core blank is punched and an undesirably low yield rate. Further, this process cannot create an integral hub section, as used in many rotor core members, so that a separate rotor core spacer or hub has to be manufactured by some other process.

The hot forging process is inherently a higher yield rate procedure that has the further advantage of requiring less processing force than cold forging. However, hot forging alone is inadequate in attaining high dimensional accuracy and also is poorly adapted to producing a shaft aperture in the hub of the rotor core member. Consequently, the basic hot forging process must be followed by a number of machining steps to achieve the required finished form with precision controlled dimensional tolerances.

A superior method of manufacturing magnetic rotor core members for dynamoelectric machines is desired in the inventor's earlier U.S. Pat. No. 4,558,511 issued Dec. 17, 1985; the method disclosed in that patent employs a combination of hot forging and cold forging operations that minimizes many of the disadvantages of traditional processes. In the process disclosed in that patent, a segment of steel bar stock is first hot forged to form a preliminary core blank having a general approximation of the external configuration desired for the rotor core member and is then coined to form a secondary core blank closer to the final required configuration, after which the secondary core blank is gradually air cooled. At this stage, the secondary core blank may be cold punched to form a shaft aperture through its hub and simultaneously cold compressed for further shaping; alternatively, the secondary core blank may be rough machined on numerous surfaces, the rough machining also forming a shaft aperture. Finally, one or more cold compression steps complete the finished rotor core member, with no requirement for close tolerance finish machining.

Although the method of the inventor's earlier U.S. Pat. No. 4,558,511 affords a marked improvement over previously known techniques for manufacturing magnetic rotor core members, further improvement to meet current demands for higher productivity, improved dimensional accuracy, and lower manufacturing costs are highly desirable. The present invention is intended to and does afford improvements on the inventor's prior method, affording higher yield rates, further reduction of manufacturing steps, and more precise dimensional control.

SUMMARY OF THE INVENTION

It is a primary object of the present invention, therefore, to provide a new and improved method of manufacturing magnetic rotor core members for rotating-field dynamoelectric machines, particularly for alternators, that effectively minimizes or eliminates any requirement for close-tolerance machining of the core members, utilizing hot forging, coining, rough machining, cold punching and ironing, and cold compression procedures in the production of rotor core members; the method of the invention completes the finished rotor core members with minimum waste of core material, minimum energy consumption, and minimal cost at an improved yield rate and with improved dimensional precision.

Accordingly, the invention relates to an improved method of manufacture of a magnetic rotor core member for a dynamoelectric machine of the rotating-field type, the rotor core member including a cylindrical hub section mountable on a rotor shaft, an integral disc section extending radially outwardly from one end of the hub section, and a plurality of annularly spaced integral pole pieces projecting from the outer edge of the disc section in a direction parallel to the hub axis. The method comprises the following steps:

A. Hot forging a metal segment of given volume to form a preliminary core blank having a general approximation of the external configuration desired for the rotor core member, including a central hub section, an integral disc section extending radially outwardly from one end of the hub section and a plurality of pole piece fingers equally spaced around the outer edge of the disc section and projecting therefrom in a direction parallel to the axis of the hub section;

B. Coining the preliminary core blank to form a secondary core blank more closely approximating the desired external configuration for the rotor core member;

C. Gradually cooling the secondary core blank;

D. Rough machining the open end surface of the hub section and the other surface of the disc section of the secondary core blank to adjust the volume of metal to suit subsequent cold forming operations;

E. Cold punching a shaft aperture through the central portion of the hub section and simultaneously ironing the fingers to shape them to a form and dimensions closely approximating those required for the pole pieces of a finished rotor core member; and F. Cold compressing the secondary core blank to final form and dimensions to complete a finished rotor core member.

BRIEF DESCRIPTION OF THE DRAWINGS

FIGS. 3 through 8 are elevation views of a rotor core member at various stages in the method of manufacture of the present invention, FIGS. 3–5 taken from the pole-piece side of the core member and FIGS. 6–8 taken from the opposite side; and FIGS. 3A through 8A are simplified sectional views taken approximately as indicated in FIGS. 3 through 8.

DESCRIPTION OF THE PREFERRED EMBODIMENT

Figure 1:
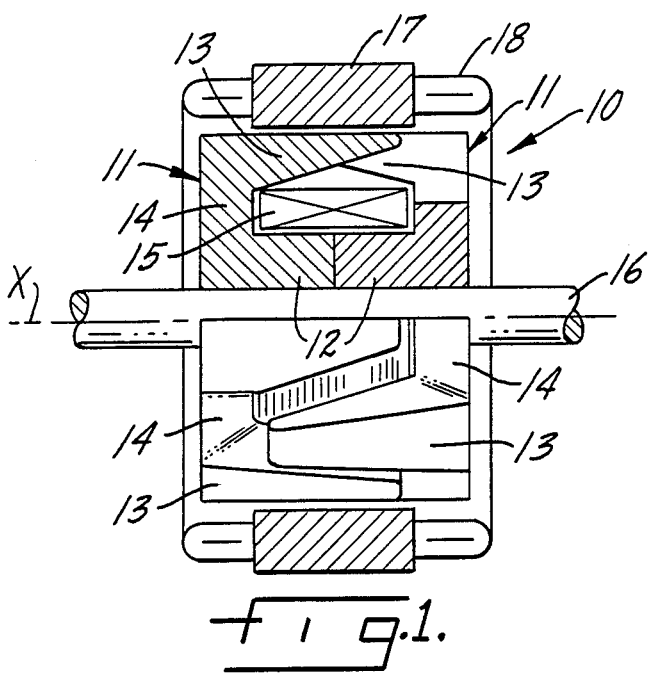
FIG. 1 is a simplified, partially schematic half-sectional elevation view of a rotating-field alternator incorporating magnetic rotor core members manufactured by the method of the present invention.

FIG. 1 illustrates a small alternator or other rotary dynamoelectric machine 10 of the rotating-field type; alternators having the construction generally illustrated for machine 10 are in common use in vehicles, small vessels, and other like applications. Alternator 10 includes a rotary magnetic core formed by two core members 11 which are usually essentially identical to each other. Each rotor core member 11 includes a cylindrical hub section 12, an integral disc section 14 extending radially outwardly from one end of the hub section, and a plurality of integral, finger-like pole pieces 13, angularly spaced from each other, that project from the outer edge of the disc section 14 in a direction parallel to the axis X of hub section 12.

In alternator 10, the two rotor core members 11 are mounted on a shaft 16 that extends through their hub sections 12, the orientations of the two core members being such that their pole pieces 13 are interleaved with each other. A field coil 15 is mounted in encompassing relation to the hub sections 12 of the two core members 11 to complete the rotor for alternator 10. An annular stator core 17 is disposed in encompassing relation to the rotor of alternator 10 and supports the usual stator coils 18 from which the output of the alternator is derived. In FIG. 1, the stator 17,18 has been shown in simplified form because it is not relevant to the present invention.

Figure 2:
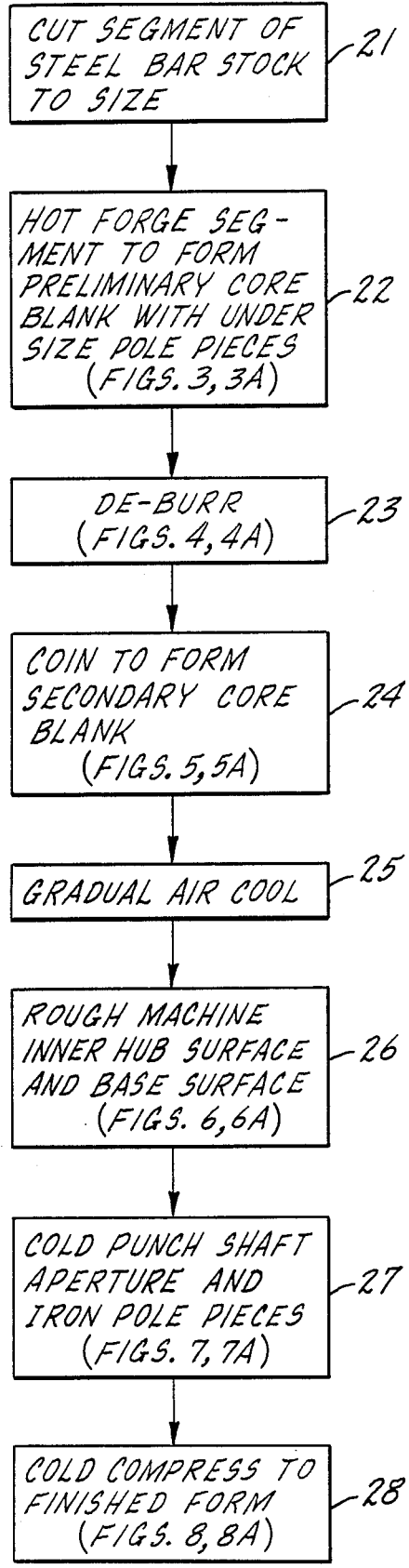
FIG. 2 is a flow chart illustrating the steps for the method of the invention.

FIG. 2 affords a flow chart of the steps involved in the method of manufacture of a rotor core member, such as one of the core members 11 of FIG. 1, according to the present invention. A number of intermediate stages of the process of FIG. 2 are illustrated in FIGS. 3–7 and FIGS. 3A–7A, culminating in a finished magnetic rotor core member 11 as shown in FIGS. 8 and 8A.

At the outset, in the first step 21 of the procedure illustrated in FIG. 2, a segment of round steel bar stock (not shown) that is to be shaped into a rotor core member is cut from a length of steel bar. Care should be exercised so that the segment will have a given volume. A conventional cutting press can be utilized for step 21. The segment of steel bar stock should have relatively closely controlled dimensions to avoid excessive waste and to assure adequate performance of succeeding steps in the manufacturing procedure. The bar stock employed may vary considerably; it usually constitutes a low carbon steel and must afford adequate magnetic properties for the core of an alternator or other small dynamoelectric machine.

Figure 3:
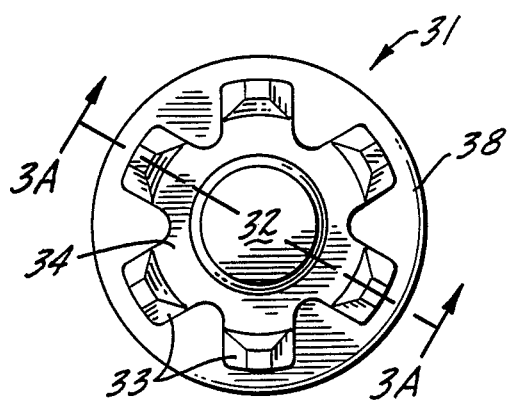
Figure 3A:
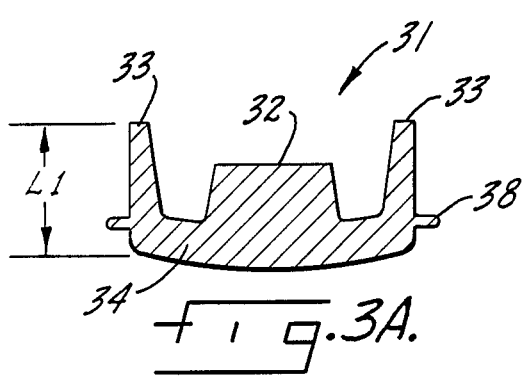

In the second step 22 of the manufacturing method illustrated in FIG. 2, the bar stock segment from step 21 is hot forged to form a preliminary core blank 31, shown in FIGS. 3 and 3A. The shape of the preliminary core blank 31 is a general approximation of the desired external configuration for the finished rotor core member 11 (FIGS. 1, 7 and 7A) with the exception of the pole piece fingers as explained hereinafter.

The preliminary core blank 31 consists of a central hub section 32, still solid rather than cylindrical, an integral disc section 34 extending radially outwardly from one end of the hub section, and a plurality of integral fingers 33 that are equally spaced along the outer edge of the disc section and project therefrom in a direction parallel to the axis of the hub section. The fingers 33, however, are formed to have a length L1 that is somewhat shorter than the length L2 (FIG. 8A) required for the pole pieces 13 of a finished rotor core member 11, while all other elements are formed to as close an approximation as possible of their required final forms.

At this stage, any excess material in the original segment of steel bar stock may produce a forging burr 38 around the periphery of the preliminary core blank 31 and between its fingers 33. The next step 23 in the manufacturing procedure illustrated in FIG. 2 is de-burring of the preliminary core blank formed in the preceding step 22. No sophisticated process is involved. Conventional punching procedures are utilized to eliminate the forging fringe or burr 38 from core blank 31 (FIGS. 3 and 3A). De-burring produces the cleaned-up version of the preliminary core blank 31 that is illustrated in FIGS. 4 and 4A.

The fourth step 24 in the manufacturing process, FIG. 2, is coining of the preliminary core blank formed in the preceding steps to produce a secondary core blank more closely approximating the desired external configuration for one of the rotor core members 11. This coining operation also facilitates the subsequent rough machining operation of step 26. Again, no sophisticated or special equipment is required. A conventional coining press is utilized, further shaping the core blank to the configuration illustrated for the secondary core blank 41 shown in FIGS. 5 and 5A. In core blank 41, the central hub section 42 is still solid. The disc section 44 has been flattened to a closer approximation of the required final form. The fingers 43 that are to form the pole pieces of the rotor core member are still shorter than required for their final form.

In the fifth step 25 of the manufacturing procedure, FIG. 2, the secondary core blank 41 from step 24 (see FIGS. 5 and 5A), which has been hot since step 22, is gradually air cooled. Most simply and effectively, the secondary core blanks are left to cool from the red-hot condition in which they emerge from the coining press (step 24) until they cool off naturally. The combination of the hot forging operation of step 22 and the gradual air cooling operation of step 25 affords, without the expense of special heat treatment procedures, an effect which is comparable to an annealing treatment that tends to homogenize the magnetic steel being worked, with the result that subsequent cold forging processes require less force and energy than if cold processing were used throughout the manufacturing procedure and with the further result that the final product affords improved electrical performance.

The sixth step 26 in the manufacturing procedure is rough machining of the outer surface 44A of disc section 44 and the open-end surface 42A of hub section 42 as indicated in FIG. 6A. That is, only these two portions of the core blank 41 are rough machined as compared with the rough machining of numerous surfaces effected in U.S. Pat. No. 4,558,511.

By comparison with the machining operations which follow hot forging in the traditional hot forging process to provide a rotor core member, the rough machining in step 26 as discussed herein, is employed to remove a much smaller quantity of metal from the core blank. Step 26 is a much simpler, much less time-consuming, and much less sophisticated sort of machining than in the traditional process; it is principally intended to adjust the volume of metal in the secondary core blanks 41 to suit subsequent cold forging in steps 27 and 28.

In any forging operation, it is highly desirable to make certain that a uniform quantity of metal is contained within the forging dies; this is particularly important in cold forging operations. Generally, the uniformity in quantity of metal of the secondary core blanks 41, after step 26, provides such benefits as ease of cold forging (requiring less force and energy), prolonged life for the cold forging dies, reduction of product spoilage and of dimensional variations, etc., with the result that improved productivity and higher yield rate are achieved.

The seventh step 27 in the manufacturing procedure of FIG. 2 is cold punching of the central portion of hub section 42 to cut a shaft aperture 46, illustrated in FIGS. 7 and 7A. At the same time, the press employed for the cold punching operation is utilized for ironing the fingers 43 to shape them to a form, a length and dimensions very closely approximating those required for the pole pieces 13 of a finished rotor core member. Thus, at this stage, FIG. 7A, the length L3 of fingers 43 is appreciably greater than the initial finger length L1, FIG. 3A; L3 may still be very slightly shorter or longer than the required finished pole piece length L2 (FIG. 8A). The dimensions of the shaft aperture 46 are still inadequate and inaccurate, particularly in the portion of the aperture close to the open end 46A of the hub section, FIG. 7A.

A section or a part of a hot forged workpiece which is long yet slender in contour, like a pole piece of a rotor core member, is the trickiest of all sections, and can at times emerge from the hot forging dies with an inadequate or incomplete shape, particularly in length, rendering the hot forged blank a reject. To minimize the risks of having such a defective forging, manufacturers utilizing traditional hot forging processes have had to start with a metal segment having a substantially greater volume than theoretically required in order to insure that these tricky, intricate sections acquire a desired, complete shape with an adequate volume of metal. This is one of the reasons the pole piece fingers 33 are formed to a lesser length L1 in the initial hot forging stage 22 and then ironed to a very close approximation L3 of their required final length L2 in the subsequent cold forging and ironing procedure of step 27.

By comparison with the inventor's earlier method, U.S. Pat. No. 4,558,511, in which the pole piece fingers are formed in an initial hot forging step to a relatively close approximation of the external configuration desired for the pole pieces of a finished rotor core member, the method of the present invention, which starts with the fingers having a length shorter than finally required and irons them, in the later stage 27, to a close approximation of their required final form, affords an appreciable reduction of spoilage of forgings as well as substantial saving in starting material. The ironing procedure for pole piece fingers 43, FIG. 7A, is so effectual and adequate in providing them with a form and dimensions closely approximating those required for pole pieces 13 that it eliminates any need for rough machining the periphery of the core blank and the tips of the fingers, which are among the most critical surfaces in the pole pieces of a rotor core member and which, according to the inventor's earlier method, were rough-machined to a closer approximation of their required, final configuration. The ironing procedure also permits the concluding, finishing step 28 to be performed in just one cold compression.

The final step 28 in the manufacturing process, FIG. 2, is a cold compression procedure, carried out in a conventional cold forging press, to achieve the final, finished shape for a rotor core member 11, illustrated in FIGS. 8 and 8A. As stated in connection with the preceding step 27, a single cold compression is adequate. This concluding cold forming procedure provides the final, finished configuration for all elements of rotor core member 11, including the hub section 12 with its finished shaft aperture 56, the disc section 14 that joins the pole pieces 13 to hub 12, and all edges, transition surfaces and corners.

The initial hot forging step 22 produces a relatively close approximation of the desired external configuration for the rotor core member directly from a metal segment, whereas the traditional cold forging (cold extrusion) and cold forming stamping methods require additional steps to shape a starting piece of material into a general approximation of its required final configuration. The combination of steps 22 and 25, hot forging and gradual air-cooling, affords a favorable effect on subsequent steps of metal working, without the expense of special heat treatment procedure. The uniformity in quantity of metal in secondary core blanks 41 that results from limited rough machining in step 26 affords such benefits as ease of subsequent cold forging requiring less force and energy, a prolonged life of the cold forging dies, reduction of spoilage of cold forged blanks, and reduction of dimensional variations, with resulting higher yield rate and higher dimensional precision.

The initial hot forging of the pole piece fingers 33 (step 22, FIG. 3A) to lengths less than required for the pole pieces of a finished rotor core member, and subsequent ironing of the fingers to a close approximation of their final length, form and dimensions in step 27 also contributes much toward saving in starting material, reduction of spoilage of hot forged blanks, curtailment of manufacturing procedures and attainment of higher dimensional precision. The method of manufacture of the present invention, combining the steps of hot forging, coining, gradual air cooling, limited rough machining, cold punching of a shaft aperture simultaneously with ironing of the fingers, and cold compressing, makes it possible to complete a rotor core member of high dimensional accuracy with high productivity, with minimum waste of material and minimal energy consumption, and at minimum cost.

I claim:

1. An improved method of manufacture of a magnetic rotor core member for a dynamoelectric machine of the rotating-field type, the rotor core member including a cylindrical hub section mountable on a rotor shaft, an integral disc section extending radially outwardly from one end of the hub section, and a plurality of annularly spaced integral pole pieces projecting from the outer edge of the disc section in a direction parallel to the hub axis, the method comprising the following steps:
   A. hot forging a metal segment of given volume to form a preliminary core blank having a general approximation of the external configuration desired for the rotor core member, including a central hub section, an integral disc section extending radially outwardly from one end of the hub section and a plurality of pole piece fingers equally spaced around the outer edge of the disc section and projecting therefrom in a direction parallel to the axis of the hub section;
   B. coining the preliminary core blank to form a secondary core blank more closely approximating the desired external configuration for the rotor core member;
   C. gradually cooling the secondary core blank;
   D. rough machining the open end surface of the hub section and the outer surface of the disc section of the secondary core blank to adjust the volume of metal to suit subsequent cold forming operations;
   E. cold punching a shaft aperture through the central portion of the hub section and simultaneously ironing the fingers to shape them to a form and dimensions closely approximating those required for the pole pieces of a finished rotor core member; and
   F. cold compressing the secondary core blank to final form and dimensions to complete a finished rotor core member.

2. The method of manufacturing a magnetic rotor core member according to claim 1 in which, in step A, the pole piece fingers are formed with lengths shorter than required for the rotor core member pole pieces and in which, in step E, the finger lengths are increased by the ironing.

3. The method of manufacturing a magnetic rotor core member according to claim 2 in which step C is carried out by gradual air-cooling of the secondary core blank.

4. The method of manufacturing a magnetic rotor core member according to claim 3 including the following additional step:
   A'. de-burring the preliminary core blank after hot forging in step A and prior to coining in step B.

5. The method of manufacturing a magnetic rotor core member according to claim 2 in which the pole piece finger length L1 following step A, the finished pole piece length L2 following step F, and the pole piece finger length L3 following step E are in the relation $L2 > L1 < L3$.

6. The method of manufacturing a magnetic rotor core member according to claim 2 in which step F is carried out in a single cold compression operation.

7. The method of manufacturing a magnetic rotor core member according to claim 6 in which the rough machining operations of step D are limited to the two surfaces recited therein.

* * * * *